US010237624B2

(12) United States Patent
Gerhards et al.

(10) Patent No.: US 10,237,624 B2
(45) Date of Patent: Mar. 19, 2019

(54) TELEVISION RECEIVER COMMUNICATION AND RESOURCE SHARING

(71) Applicant: DISH Technologies L.L.C., Englewood, CO (US)

(72) Inventors: Keith Gerhards, Parker, CO (US); Danny J. Minnick, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 64 days.

(21) Appl. No.: 15/068,287

(22) Filed: Mar. 11, 2016

(65) Prior Publication Data

US 2017/0264947 A1    Sep. 14, 2017

(51) Int. Cl.
*H04N 7/16* (2011.01)
*H04N 21/643* (2011.01)
(Continued)

(52) U.S. Cl.
CPC ..... *H04N 21/64322* (2013.01); *H04N 21/254* (2013.01); *H04N 21/4147* (2013.01); *H04N 21/4263* (2013.01); *H04N 21/6143* (2013.01); *H04N 21/6175* (2013.01); *H04N 21/632* (2013.01)

(58) Field of Classification Search
CPC ......... H04N 21/2668; H04N 21/47214; H04N 21/47202; H04N 21/6582; H04N 21/6175; H04N 21/4331; H04N 21/4516; H04N 21/6143; H04N 21/4263; H04N 21/252; H04N 21/2402; H04N 21/2385; H04N 21/4467; H04N 21/4433; H04N 21/242; H04N 21/2393; H04N 21/4781; H04N 21/6587; H04N 21/814; H04N 21/8146;

(Continued)

(56) References Cited

U.S. PATENT DOCUMENTS

| 2004/0163130 A1* | 8/2004 | Gray ........................ H04N 7/15 725/132 |
| 2008/0134265 A1* | 6/2008 | Tsubota .................. H04N 7/15 725/110 |
| 2012/0047532 A1* | 2/2012 | McCarthy, III .... H04N 5/44543 725/39 |

* cited by examiner

Primary Examiner — Nasser M Goodarzi
Assistant Examiner — An V Nguyen
(74) Attorney, Agent, or Firm — Kilpatrick Townsend & Stockton, LLP

(57) ABSTRACT

Embodiments described herein provide various techniques for communication, collaboration, and resource sharing between television receivers operating at separate locations. In some embodiments, a television receiver device may be configured to identify and transmit various receiver data to other associated television receivers at separate physical locations. In order to transmit data from one receiver to another, the transmitting receiver device may establish a connection to an Internet Protocol (IP) network, contact a television provider server to obtain network addresses for one or more related receiver devices, and then transmit the data over the IP network to the related receiver devices. Additional aspects relate to identifying and sharing resources between associated television receivers operating at separate locations. For example, associated television receivers operating at separate locations may use IP network communication to coordinate collaboration and sharing of tuners, storage space, and/or other hardware and software components of the receivers.

3 Claims, 9 Drawing Sheets

(51) Int. Cl.
*H04N 21/61* (2011.01)
*H04N 21/4147* (2011.01)
*H04N 21/254* (2011.01)
*H04N 21/426* (2011.01)
*H04N 21/63* (2011.01)

(58) Field of Classification Search
CPC ............... H04N 21/632; H04N 21/439; H04N 21/23439
USPC ... 725/28, 39, 87, 62, 81, 116, 148, 132, 46, 725/135, 35, 110, 61, 5, 114, 100, 133, 725/86, 151, 91, 32, 25, 58
See application file for complete search history.

10,237,624 B2

TELEVISION RECEIVER COMMUNICATION AND RESOURCE SHARING

BACKGROUND OF THE INVENTION

The advent of the digital video recorder and the availability of high-capacity and affordable computer-readable storage devices have made available many possibilities for television programming service providers and viewers alike. Television viewers have come to expect flexibility and convenience with respect to the recording and/or accessing of content via their television receivers. As such, many television receivers operating at locations such as residences, businesses, and other locations often include specialized hardware and software configured to support many different features and configurations relating to receiving, recording, storing, and outputting television programming.

BRIEF SUMMARY OF THE INVENTION

Aspects described herein provide various techniques for communication, collaboration, and resource sharing between television receivers and other subscriber equipment operating at separate locations. In some embodiments, a television receiver device may be configured to identify and transmit various receiver data to other associated television receivers at separate physical locations. For example, a first television receiver at a first location (e.g., a primary residence) may transmit certain data stored by the receiver to a second television receiver at a second location (e.g., second residence, business, etc.). The data transmitted between associated receivers may include, for example, digital video recorder (DVR) timers, receiver configuration settings and preferences, parental control and access restriction settings, home automation settings, and/or recorded television programs and other media files stored locally in the memory of the receiver. In order to transmit data from one receiver to another, the transmitting receiver device may establish a connection to an Internet Protocol (IP) network, contact a television provider server to obtain network addresses for one or more related receiver devices, and then transmit the data over the IP network to the related receiver devices. The receiver devices may receive, store, and/or apply the data, including setting new timers, updating configuration settings and home automation settings, saving programs locally in a DVR database, etc. In some examples, a backend television provider server may serve as a receiver data repository to store and facilitate the exchange of receiver data between related television receivers. In other examples, some or all of the receiver data may be transmitted directly between television receiver devices.

Additional aspects described herein relate to identifying and sharing resources between associated television receivers operating at separate locations. As described below, associated television receivers operating at separate locations may use IP network communication to coordinate collaboration and sharing of tuners, storage space, and/or other hardware and software components of the receivers. For example, a first receiver at a first location (e.g., a primary residence) may receive an instruction to receive and output particular television programming for live viewing (or to record and store for later viewing). If the first receiver determines that it does not have sufficient hardware or software resources (e.g., tuners, storage space, etc.) to receive and output/record the particular programming, the first receiver may transmit a request for the necessary resources to one or more associated receivers at separate locations. In some cases, to transmit such requests, the requesting device may establish a connection to an Internet Protocol (IP) network, contact a television provider server to obtain network addresses for one or more associated receivers, and then transmit the request over the IP network to the associated receivers. In this example, a second receiver associated with the first receiver may respond to the request, and then use its own available tuners and storage space to receive and store the particular programming. The second receiver then may transmit back the particular programming via the IP network to the first receiver. In some cases, the particular programming may be received and transmitted back to the first receiver in real-time, to support live television viewing at the first receiver. In other cases, the particular programming may be stored and transmitted back to the first receiver at a later time, which may be determined based on the IP network capabilities and conditions.

BRIEF DESCRIPTION OF THE DRAWINGS

The present invention is described in conjunction with the appended figures.

Figure 1:
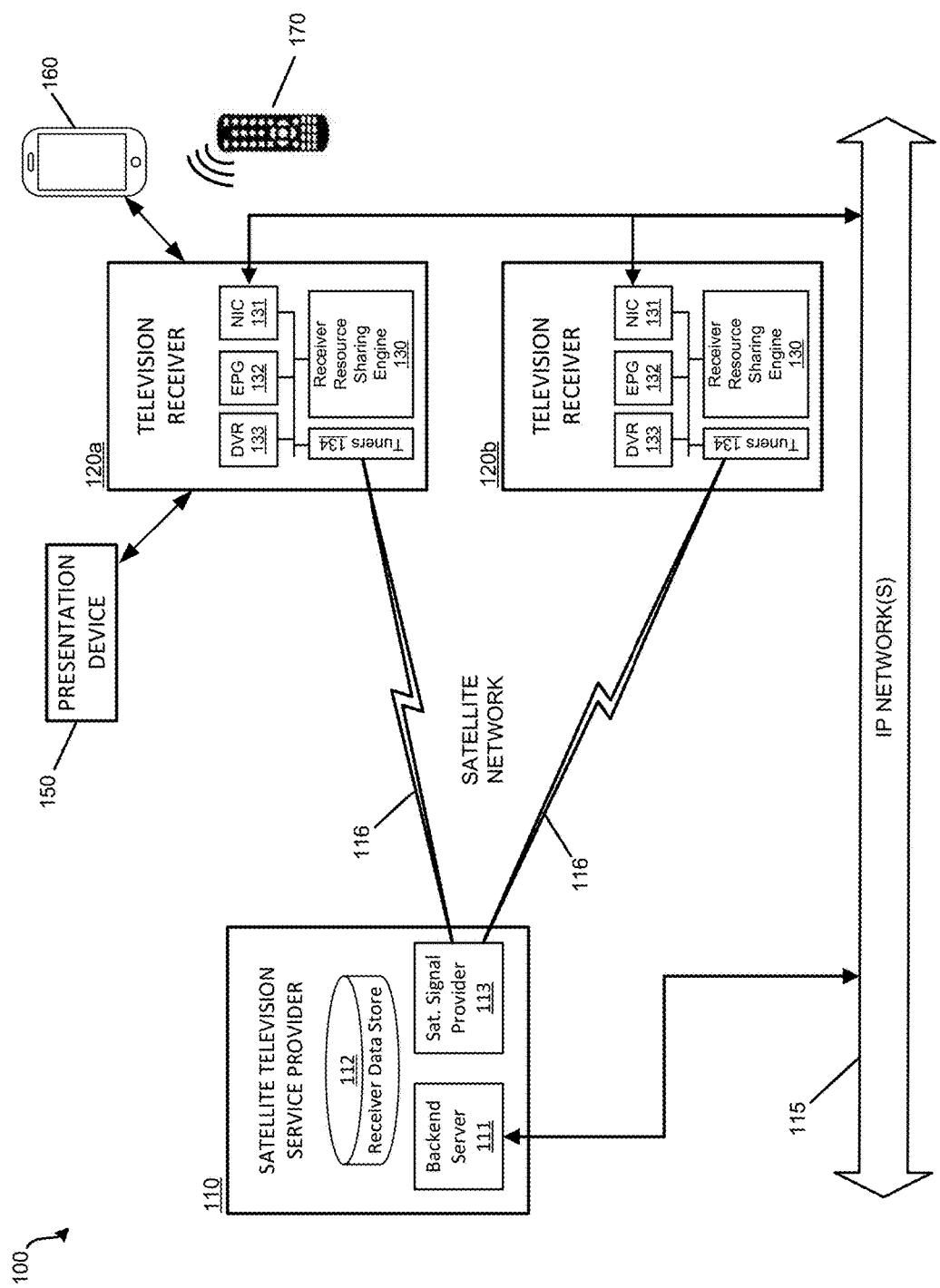
FIG. 1 is a block diagram illustrating an embodiment of a television receiver resource sharing system, according to one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for communication, collaboration, and resource sharing between television receivers and other subscriber equipment operating at separate locations. In some embodiments, a television receiver device may be configured to identify and transmit various receiver data to other associated television receivers at separate physical locations. For example, a first television receiver at a first location (e.g., a primary residence) may transmit certain data stored by the receiver to a second television receiver at a second location (e.g., second residence, business, etc.). The data transmitted between associated receivers may include, for example, digital video recorder (DVR) timers, receiver configuration settings and preferences, parental control and access restriction settings, home automation settings, and/or recorded television programs and other media files stored locally in the memory of the receiver. In order to transmit data from one receiver to another, the transmitting receiver device may establish a connection to an Internet Protocol (IP) network, contact a television provider server to obtain network addresses for one or more related receiver devices, and then transmit the data over the IP network to the related receiver devices. The receiver devices may receive, store, and/or apply the data, including setting new timers, updating configuration settings and home automation settings, saving programs locally in a DVR database, etc. In some examples, a backend television provider server may serve as a receiver data clearinghouse to store and facilitate the exchange of receiver data between related television receivers. In other examples, some or all of the receiver data may be transmitted directly between television receiver devices.

Additional aspects described herein relate to identifying and sharing resources between associated television receivers operating at separate locations. As described below, associated television receivers operating at separate locations may use IP network communication to coordinate collaboration and sharing of tuners, storage space, and/or other hardware and software components of the receivers. For example, a first receiver at a first location (e.g., a primary residence) may receive an instruction to receive and output particular television programming for live viewing (or to record and store for later viewing). If the first receiver determines that it does not have sufficient hardware or software resources (e.g., tuners, storage space, etc.) to receive and output/record the particular programming, the first receiver may transmit a request for the necessary resources to one or more associated receivers at separate locations. In some cases, to transmit such requests, the requesting device may establish a connection to an Internet Protocol (IP) network, contact a television provider server to obtain network addresses for one or more associated receivers, and then transmit the request over the IP network to the associated receivers. In this example, a second receiver associated with the first receiver may respond to the request, and then use its own available tuners and storage space to receive and store the particular programming. The second receiver then may transmit back the particular programming via the IP network to the first receiver. In some cases, the particular programming may be received and transmitted back to the first receiver in real-time, to support live television viewing at the first receiver. In other cases, the particular programming may be stored and transmitted back to the first receiver at a later time, which may be determined based on the IP network capabilities and conditions.

Thus, the various techniques described herein may provide television receiver devices with increased capabilities and other functional enhancements, by enabling resource sharing between associated receivers at separate locations. For example, the television receiving, recording, storing, and/or outputting capabilities of a first receiver may be increased by allowing the first receiver to identify and assign available resources such as tuners, storage space, etc., at other associated receivers to perform various tasks that cannot be performed by the first receiver. In some embodiments, the communication, collaboration, and resource sharing between television receivers may be performed securely and efficiently over an IP network. In certain cases, secure data transmission protocols and/or encryption may be used to protect the communications between receiver devices, and the limited transmission bandwidth of satellite or cable broadcast networks need not be used to facilitate the receiver communications.

The various embodiments described herein may be implemented on and within one or more different network systems, including satellite or terrestrial television distribution systems, telecommunications network systems, computer networks data such as the Internet, cellular and other mobile networking systems, and the like. Therefore, although certain examples below are described in terms of a specific network system (e.g., a satellite television distribution system) and specific user equipment (e.g., television receivers, set-top boxes, user devices and remote control devices, etc.), it should be understood that similar or identical embodiments may be implemented using other network systems and architectures (e.g., cable television networks, telecommunication networks, computer networks), as well as other user equipment and devices (e.g., servers, routers, firewalls, gaming consoles, personal computers, smartphones, etc.).

Referring now to FIG. 1, an example receiver resource sharing system 100 is shown on which various aspects of the present disclosure may be implemented. In this example, the receiver resource sharing system 100 includes one or more television receivers 120 configured to receive television content from a satellite television service provider 110 over a satellite communication network 116. As discussed below, in some embodiments, television receiver 120 may support various functionality to establish and connect to satellite television provider 110, and/or other television providers (e.g., cable television service providers, Internet-based television service providers, etc.) via backend servers 111 over IP network 115. Television receivers 120 may communicate with backend servers 111, for example, to request/receive various receiver data and/or network addresses of associated receiver devices 120. Television receivers 120 also may communicate with other associated receiver devices 120 operating at separate locations, directly or indirectly over the IP network 115, to transmit and receive various receiver data, such as recording timers, configuration settings and preferences, parental control and access restriction settings, home automation settings, and/or recorded television programs. In some cases, the receiver data may be secure and/or confidential, and the communication between receivers 120 via the IP network 115 may use secure data transmission protocols and/or encryption to protect the secure receiver data. Additionally, in some embodiments, receivers 120 may communicate directly and/or indirectly through television providers 110 to identify and share hardware and software resources (e.g., tuners, storage space, etc.) with other associated receivers 120 operating at separate locations.

In order to perform these features and the additional functionality described below, each of the components and sub-components shown in example system 100, such as television receivers 120, the servers and systems within the satellite television service provider 110 (e.g., 111-113), the presentation device 150, the user computing device 160, etc., may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication networks 115 and 116 (as well as other communication networks not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the television receivers 120, television service provider 110, and other components within the receiver resource sharing system 100.

Television receivers 120a and 120b, which may be referred to individually or collectively as television receiver(s) 120, may be implemented using various specialized user equipment devices, such as cable system set-top boxes, satellite system set-top boxes, WiFi or Internet-based set-top boxes, gaming consoles, and the like. In other examples, television receivers 120 may be implemented using (or integrated into) other computing devices such as personal computers, network routers, tablet computers, mobile devices, etc. Thus, a television receiver 120 may be implemented as a single computing device or a computing system including a combination of multiple computing devices, storage devices, network components, etc. In some examples, a television receiver 120 may correspond to a primary television receiver (PTR) 210 including one or more network interface components (NICs) 131, an electronic programming guide (EPG) user interface component 132, a digital video recorder (DVR) 133, and a plurality of tuners 134 and related hardware/software components (e.g., audio/video decoders, descramblers, demultiplexers, etc.) as described below in more detail in FIGS. 2-3. In some cases, television receivers 120 may include one or more internal data stores and/or external data stores (e.g., external storage systems, database servers, file-based storage, cloud storage systems, etc.) configured to store television programs (e.g., audio/video files corresponding to television broadcast programs, etc.), as well as image data and music/audio content that may be stored on television receivers 120 and output via presentation devices 150. In some embodiments, such data stores may reside in a back-end server farm, storage cluster, and/or storage-area network (SAN). As shown in this example, a receiver resource sharing engine 130 also may be implemented within the television receivers 120 to perform various functionality and communications relating to television receiver communication, collaboration, and resource sharing processes, including communicating with television provider servers 111 to retrieve network addresses of associated receivers 120, transmitting/receiving various types of data to/from other associated receivers 120, storing and applying data received from other associated receivers 120, identifying and assigning resources at other receivers 120 to receive television programming, and transmitting/receiving television programming between associated receivers 120 via IP network 115, as described in more detail below.

As shown in this example, television receivers 120 may be configured to communicate with satellite television service provider 110 over multiple communication networks 115 and 116. For example, a receiver 120 may receive television content from satellite television provider 110 via a satellite signal provider 113 over satellite network 116. Although only one example television provider 110 is shown in FIG. 1, it should be understood that any number of different television providers may be used in other embodiments, including additional satellite television service providers, cable television service providers configured to broadcast television content to receivers 120 over a wired network infrastructure, on-demand television providers, pay-per-view (PPV) television providers, Internet-based television providers, television streaming services, etc. Additionally, although various components within the television receivers 120 and television service provider 110 are illustrated as standalone computer systems in this example, any or all of these components may be implemented within and/or integrated into one or more servers or devices of various content distribution systems and other computing architectures. For example, as discussed below in reference to FIGS. 2 and 3, the receiver resource sharing engine 130 may be implemented solely within a television receiver 120, or may be implemented within a combination of devices of a satellite television distribution system 200 or other receiver resource sharing system 100. For example, the receiver resource sharing engine 130 may be implemented via one or more receiver resource sharing services 230 operating within servers 218 and/or television receivers 210 and 212 within a satellite television distribution system 200. In other embodiments, the receiver resource sharing engine 130 may be implemented similarly, as a standalone component and/or in a distributed manner, within other types of content distribution systems, such as terrestrial (e.g., cable) television distribution systems, telecommunications network systems, LAN or WAN computer networks (e.g., the Internet), cellular and other mobile networking systems, and any other computing environment configured to provide content. In any of these examples, the receiver resource sharing engine 130 may be implemented within (or integrated into) television receivers 120 as shown in FIG. 1, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television content received and/or decoded by television receivers 120 may be presented via one or more presentation devices 150. Presentation devices 150 may correspond to televisions and other television viewing devices (e.g., home computers, tablet computers, smartphones, etc.). Additionally, various receiver resource sharing systems 100 may incorporate other user equipment and devices, such as user devices 160 and remote control devices 170 configured to communicate with associated television receivers 120 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 120 and/or specific customer accounts of receiver resource sharing systems 100. As shown in FIG. 1, user devices 160 may be configured to receive data from and transmit data to an associated television receiver 120. Additionally or alternatively, user devices 160 may be configured to communicate directly with one or more television service providers 110, so that certain transmissions of television content and other functionality (e.g., retrieving receiver data and/or network addresses of other associated television receivers 120, etc.) may potentially bypass the television receiver 120 in some embodiments.

Different presentations devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television receiver 129 or television service provider 110 may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 160 selected to output the notification. Additionally, in some cases, users may establish user-specific preferences, which may be stored in the memory of the television receiver 120, for outputting specific types of user notifications to specific types of presentation devices 150 and/or user devices 160.

The television receivers 120, television service providers 110, presentation devices 150, and user devices 160 each may include the necessary hardware and software components to establish network interfaces and transmit and receive various types of television receiver data, as well as television signals or programs, user interfaces, notifications, etc. Some or all of these devices may include security features and/or specialized hardware (e.g., hardware-accelerated SSL and HTTPS, WS-Security, firewalls, etc.) in order to present the various confidential data transmitted between components (e.g., receiver identification data, receiver configuration data, resource sharing requests, etc.), and to prevent hacking and other malicious access attempts within the system 100. In some cases, the television receivers 120 may communicate with television service provider 110, other associated television receivers 120, and/or user devices 160, using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the television receivers 120, television providers 110, and user devices 160. SSL or TLS may use HTTP or HTTPS to provide authentication and confidentiality.

As shown in this example, a television receiver 120 may communicate with one or more television service providers 110, one or more other associated receivers 120, and/or user devices 160, over various different communication networks 115. For example, network 115 is an Internet Protocol (IP) network, which may use the Internet networking model and/or communication protocols. IP network 115, through which television receivers 120 may communicate with other receivers 120, as well as television service providers 110, may include local area networks (LANs), wide area networks (WANs) (e.g., the Internet), and/or various wireless telecommunications networks. For example, when a receiver resource sharing engine 130 is implemented within a television receiver 120, wireless router, modem, or other local user equipment, then IP network 115 may include wireless local area networks (WLANs) or other short-range wireless technologies such as Bluetooth®, mobile radio-frequency identification (M-RFID), and/or other such communication protocols. In other examples, when at least a portion or component of a receiver resource sharing service 230 is implemented remotely at a backend server 111, or other computer server, satellite hub, cable headend, etc., then IP network 115 may include one or more WANs (e.g., the Internet), various cellular and/or telecommunication networks (e.g., 3G, 4G or EDGE (enhanced data rates for global evolution), WiFi (IEEE 802.11 family standards, or other mobile communication technologies), or any combination thereof. Additionally, system 100 includes satellite networks 116 in this example (and in other examples may include cable data networks and other communication network types), which may be used for transmitting satellite television data signals (and cable or other types of television data signals) to receivers 120. However, it should be understood that IP network 115 also may include various components of satellite communication networks and/or or terrestrial cable networks in some embodiments. For communication between presentation device 150, user devices 160, remote controls 170, and their associated television receivers 120, then communications may include use of a WLAN and/or other short-range wireless technologies. However, for communication between television receivers 120 and remotely located mobile user devices 160 (and/or for user devices 160 that are configured to communicate directly with television service providers 110), then communications may include WANs, satellite networks, terrestrial cable networks, and/or cellular or other mobile telecommunication networks, etc.

As discussed above, various components of the receiver resource sharing system 100 may be implemented as stand-alone hardware and software systems, and may be implemented within one or more different computer network systems and architectures. For example, in reference to FIGS. 2 and 3, the receiver resource sharing system 100 may be implemented using one or more receiver resource sharing services 230 executing within server hardware 218 and/or receiver devices 210 within a satellite television distribution system 200. However, in other embodiments, the components of a television receiver authorization system 100 may be incorporated within various different types of content distribution systems. For example, corresponding embodiments to those described in FIGS. 2 and 3 may be implemented within terrestrial cable television distribution systems, telecommunications network systems, LAN or WAN computer networks (e.g., the Internet), cellular and other mobile networking systems, and the like. In any of these examples, a receiver resource sharing system 100 may be implemented within (or integrated into) one or more content servers (e.g., satellite hubs, cable head ends, Internet servers, etc.), one or more local computing devices (e.g., televisions, television receivers, set-top boxes, gaming consoles, stand-alone home monitoring stations, network routers, modems, personal computers, and the etc.), or a combination of server-side devices/services and local devices/services. Thus, although not so limited, an appreciation of various aspects of the present disclosure may be gained from the following discussion in connection with FIGS. 2 and 3.

Figure 2:
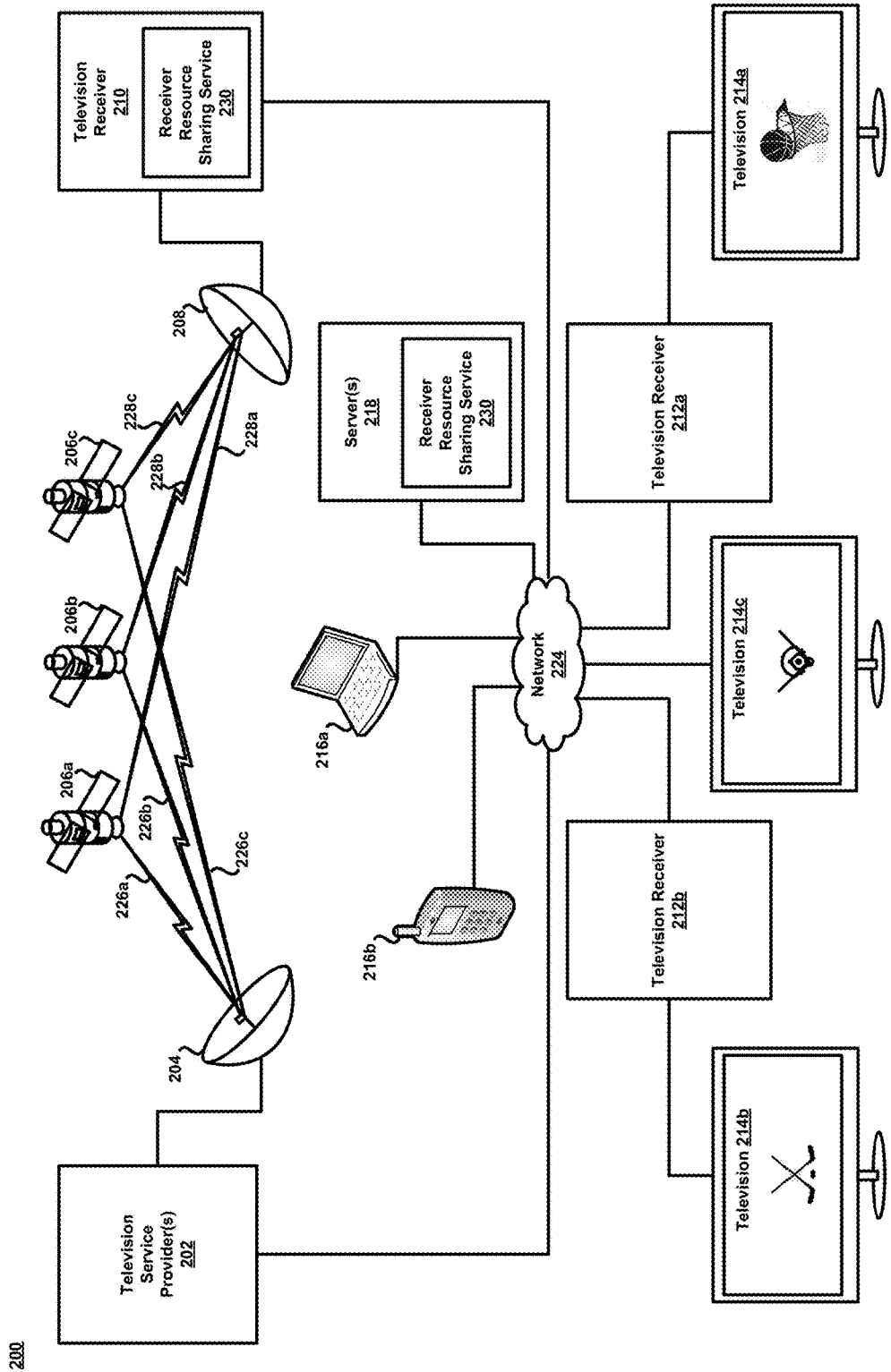
FIG. 2 is a block diagram illustrating an example satellite television system, according to one or more embodiments of the disclosure.

Referring now to FIG. 2, an example satellite television distribution system 200 is shown in accordance with the principles of the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include one or more service providers 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may in general be associated with or operated by or implemented by the service providers 202. Additionally, the PTR 210 and/or the server 218 may include or otherwise exhibit an instance of receiver authorization service module 240. The receiver resource sharing module 230 may be implemented and configured using various hardware and software components discussed above, in order to support the features and perform the functionality of the various receiver resource sharing systems 100 discussed above in reference to FIG. 1. Thus, receiver resource sharing service modules 230 in this embodiment may be configured to, for example, communicate with television service providers 202 and/or servers 218 to retrieve network addresses of associated receivers devices at separate locations, transmitting/receiving various types of data to/from other associated receivers, storing and applying data received from other associated receivers, identifying and assigning resources at other receivers to receive television programming, and transmitting/receiving television programming between associated receivers via IP network 115, as described in more detail below.

The system 200 may further include at least one network 224 that establishes a bi-directional communication path for data transfer between and among each respective element of the system 200, outside or separate from the unidirectional satellite signaling path. The network 224 may correspond to the IP network 115 discussed above in reference to FIG. 1, and/or may represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212a-b, as described throughout may generally be any type of television receiver, television converter, etc., such as a set-top box (STB) for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
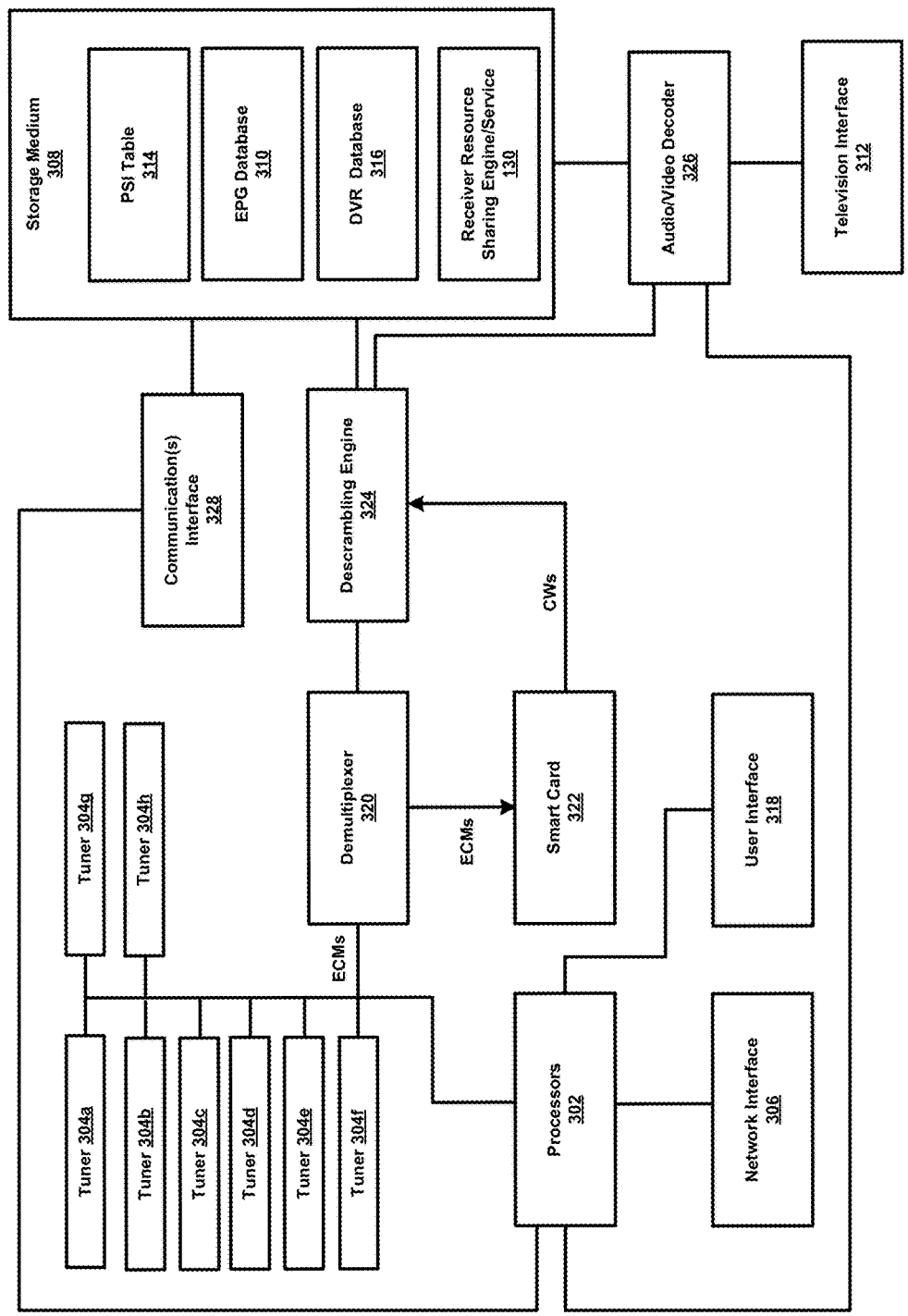
FIG. 3 is a block diagram illustrating an example television receiver device, according to one or more embodiments of the disclosure.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-f may be used to tune to television channels, such as television channels transmitted via satellites 206a-c. Each one of the tuners 304a-f may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although six tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between a service provider 202 of FIG. 2 and the PTR 210 may be via satellites 206a-c, which may be unidirectional to the PTR 210, and another communication channel between the service provider 202 and the PTR 210, which may be bidirectional, may be via the network 224 (e.g., IP network 115). In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the receiver resource sharing engine 130 discussed above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-f and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |

TABLE 1-continued

| Channel | Satellite | Transponder | ECM PID | Audio PIDs | Video PID |
|---|---|---|---|---|---|
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-f, television channels received via satellite may contain at least some encrypted or scrambled data. Packets of audio and video may be scrambled to prevent unauthorized users, such as nonsubscribers, from receiving television programming without paying the service provider 202. When one of the tuners 304a-f is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-f may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing systems and devices as shown in FIG. 2 and FIG. 3, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 3, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 9.

For brevity, the PTR 210 is depicted in a simplified form, and may generally include more or fewer elements or components as desired, including those configured and/or arranged for communicating with television provider servers to retrieve network addresses of associated receivers devices (e.g., PTRs 210) at separate locations, transmitting/receiving various types of data to/from other associated receivers, storing and applying data received from other associated receivers, identifying and assigning resources at other receivers to receive television programming, and transmitting/receiving television programming between associated receivers via network 224 (e.g., IP network 115), in accordance with the principles of the present disclosure. For example, the PTR 210 is shown in FIG. 3 to include an instance of the receiver resource sharing engine 130 as mentioned above in connection with FIG. 1. In other examples, the PTR 210 may include a receiver resource sharing service 230, as shown above in FIG. 2, that is configured to communicate with a corresponding service 230 in a server 218. While shown stored to the storage medium 308 as executable instructions, a receiver resource sharing engine 130 (and/or service 230) could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
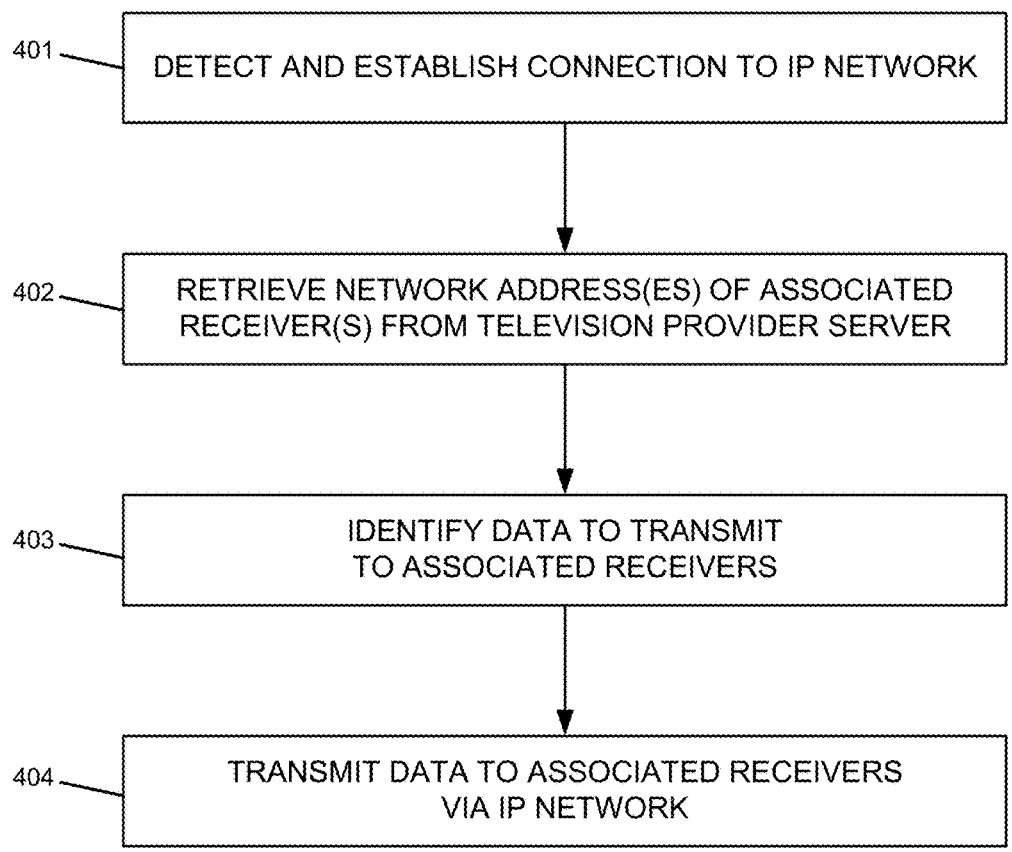
FIG. 4 is a flow diagram illustrating an example process in which a television receiver transmits data via an IP network to one or more associated receivers, according to one or more embodiments of the disclosure.

Referring now to FIG. 4, a flow diagram is shown illustrating a process of transmitting various types of television receiver data from a first receiver to associated receivers via an Internet Protocol (IP) network. As described below, the steps in this process may be performed by one or more components in the receiver resource sharing system 100 and other related systems and components described above. For example, in some cases, steps 401-404 may correspond to the functionality performed by a satellite television receiver 120a (e.g., primary receiver 210), operating autonomously or in communication with user devices 160, backend servers 111, etc. In other cases, different combinations of devices may be used to perform the steps described below. Additionally, it should be understood that the techniques described herein for transmitting data between television receivers via IP networks need not be limited to the specific systems and hardware implementations described above in FIGS. 1-3, but may be performed within other computing environments comprising other combinations of hardware and software components.

In step 401, a television receiver 120 (e.g., a first satellite and/or cable television receiver 120a) may detect and establish a connection to an IP network 115. In some cases, step 401 may be performed as part of a set-up and installation process on a new receiver 120. For example, after a user receives and connects a new television receiver 120a within the user's home or other location, the television receiver 120a may automatically initiate one or more setup processes during which the receiver 120a is installed and configured for operation at the user's location. In other examples, step 401 may be performed during a rebuild, reinstallation, or data recovery process for a receiver 120a already installed at the user's location. Such processes may be initiated automatically by the receiver, for example, in response to an error, device failure, or software upgrade. In some cases, step 401 need not be performed during a receiver setup process, but may be performed in response to a user request to transmit or receive certain receiver data from one or more associated receivers 120 via the IP network 115.

During step 401, the receiver 120a may be configured to automatically detect physical network connections attached to the receiver 120a and/or the presence of one or more available wireless networks (e.g., WLAN) or other short-range wireless connection options such as Bluetooth®, mobile radio-frequency identification (M-RFID), and/or other such communication techniques. In step cases, the receiver 120a may determine that a detected network is secure, and may output a user interface to a presentation device 150 and/or user device 160 to prompt the user to input a network password or other network authentication credentials. After connecting to one or more IP networks locally, the receiver 120a may confirm that the local network(s) are connected to the Internet and/or other wide area networks, for example, by pinging backend server 111 via the IP network 115 to confirm the existence of an available communication channel.

In step 402, the television receiver 120a may retrieve network addresses from one or more associated television receivers 120 from a computer server of a television service provider 110. As used herein, associated (or related) television receivers 120 may include different television receivers 120 that are associated with the same customer and/or account of a television service provider 110. For example, receivers 120a and 120b which are associated with the same customer or account of satellite provider 110 may be considered associated (or related) receivers 120. In some embodiments, the associated television receivers 120 operate at separate locations, including separate physical locations and/or separate networks. For example, receiver 120a may correspond to a primary television receiver (PTR) operating at a primary residence (e.g., a customer's house, apartment, condominium, etc.), while receiver 120b may correspond to a PTR operating at a separate location, such as a customer's secondary residence, a vacation home, business location, etc. In such cases, because associated receivers 120 do not operate at the same location and/or same network, the associated receivers 120 cannot communicate over a local area network (LAN) or short-range wireless technologies, using local device identifiers and the like. Thus, communication between associated receivers 120 in such examples may be performed over the IP network 115, using the Internet networking model and/or communication protocols. Each receiver 120 may use IP network addresses and/or other unique computer identifiers within a wide area networks (WAN) (e.g., the Internet) to transmit data to the other receivers 120. Such communications between receivers 120 also may traverse one or more LANs or WANs, subnetworks, routers, gateways, and firewalls and/or other network components. In some embodiments, after retrieving the network address of associated receivers 120, receiver 120a may store the network addresses in local storage 308, so that the receiver 120a need not contact the backend server 111 again before sending future communications to the other associated receivers 120.

The retrieval of associated receivers network addresses from the television service provider 110 also may be performed over the IP network 115 in some embodiments. For example, receiver 120a may connect to a backend server 111 of the television service provider via the IP network 115. The receiver 120a may transmit a request for network addresses (e.g., IP addresses) of one or more associated receivers 120. In some cases, such requests may include receiver and/or customer identification data, for example, a unique receiver number, customer account number, customer login credentials, etc., which may allow the backend server 111 to authenticate the request and identify the customer account and the associated receivers from a receiver data store 112. The backend server 111 then may retrieve and transmit the network addresses of associated receivers 120 back to the requesting receiver 120a via the IP network 115. In some embodiments, because the receiver/customer identification data and/or the network addresses of associated receivers 120 may be considered secure and confidential data, any of the secure data transmission protocols and/or encryption techniques may be used to protect the communications between the receiver 120a and backend server 111 in step 402. The various processes by which the television service provider 110 may receive and respond to requests for network addresses of associated receivers 120, as well as other requests to transmit or receive various receiver data, are described below in reference to FIG. 6.

The above example of step 402 describes a receiver 120a using IP network 115 to request and receive network addresses of associated receivers 120. However, it should be understood that in other examples, receiver 120a may use other networks (e.g., satellite network 116, cable data network, etc.) and/or other communication techniques to retrieve the network addresses of associated receivers 120 from the television provider 110. For instance, a receiver 120a may transmit a request to a television provider 110 over the IP network 115, but may receive the response with the associated network addresses over a separate network, such as a satellite or cable network that lacks or does not have a sufficient upstream channel to carry the request from the receiver 120a. Additionally, in some cases, a user device 160 (e.g., personal computer, mobile device, etc.) may receive user input and transmit a request to a television service provider 110 via a cellular network (e.g., using SMS) or other wireless networks, and may receive the network addresses of other associated receivers 120 and then may transmit the associated network addresses to the local receiver 120a. In still other examples, a user device 160 may receive user input and transmit a request to a television service provider 110, which may reply directly to the receiver 120a via the IP network 115, satellite network 116, or other networks.

In step 403, the receiver 120a may identify various receiver data to be transmitted to the other associated receivers 120 via the IP network 115. The receiver data identified in step 403 may include any data stored by the receiver 120a or otherwise accessible to the receiver 120a from other local storage devices. For example, the data identified in step 403 may include the user-programmed DVR recording timers stored at the receiver 120a. As discussed below, these recording timers may be transmitted to and stored at other associated receivers 120, thereby configuring the other receivers 120 to record and store to same programming as receiver 120a, thus making that same programming available for viewing at the customer's other locations (e.g., secondary residences, vacation homes, business locations, etc.).

Additionally or alternatively, the data identified in step 403 may include any of the various different types of configuration data, settings, and user preferences stored by the television receiver 120a. For example, television viewers may use remote controls 170 or other user devices 160 to configure a television receiver 120a to set-up favorite channel lists, establish viewing preferences, create passcode security for restricted channels or restricted content types, create parental control rules, set-up time-based, content-based, and/or channel-based viewing restrictions, and the like. Some or all of these configuration data may be identified in step 403 for transmission to the other associated receivers 120, so that the corresponding receiver configurations at the customer's other locations may be updated to match the configuration of receiver 120a.

In some examples, the data identified in step 403 also may include various home automation settings. For instance, receiver 120a may be configured monitor and/or control various home devices and appliances operating at the location of the receiver 120a (e.g., the customer's primary residence). In some cases, customers may interact with the receiver 120a, via a user device 160 or remote control 170, to configure home automation settings of one or more household devices or appliances. Such devices or appliances may include sensor devices, detectors, appliances, and various computer systems and other electronic devices configured to monitor conditions and physical locations and/or operational status of various electronic devices, and transmit the corresponding sensor data back to the television receiver 120a. In some cases, the home devices or appliances may operate in conjunction with a television receiver-based system (or other in-home or on-residence home automation-related systems), such as a home security system, home utility monitor system, home appliance monitor system, etc. Examples of such home devices or appliances may include, without limitation, security cameras, personal health/fitness monitors, intercoms, light controller devices, programmable thermostats, doorbell sensors, pet door sensors/controllers, pet feeder devices, window sensors, smoke detectors, carbon monoxide detectors, door sensors, indoor or outdoor weather sensors, home security systems, shade controllers, utility monitors, lock controllers, irrigation controllers, garage door controllers, home appliance controllers, leak detection sensors, routers, modems, and any other home/work appliances, sensors, or devices. For each of these devices operating at the same location as receiver 120a, the receiver 120a may store a set of configuration settings for the device, and may transmit the configuration settings to the device to control its operation and functional features. For example, the home automation settings identified in step 403 may include configuration settings that program/instruct certain home devices to activate or deactivate, time schedules for device activation or deactivation, and instructions and schedules for detecting and storing device status data, device usage data, detected sensor data, alarm data, event log data, and the like, and for transmitting the detected data back to an associated television receiver 120.

Additionally, in some embodiments, the receiver data identified in step 403 also may include the television content stored by the receiver 120a. For example, television programs (e.g., audio/video files corresponding to television shows or movies, sporting events, live broadcasts, etc.)

stored within a DVR database 316 or elsewhere within the receiver 120a, as well as image data, music/audio content, and/or other any data that may be stored on television receivers 120 and output to presentation devices 150, may be identified in step 403 for transmission to one or more associated receivers 120.

The identification of receiver data in step 403, and the transmission of the receiver data from a first receiver 120a to one or more associated receivers in step 404, may be performed by entirely automated processes on the receivers 120, or may include one or more manual steps based on user input received at the transmitting receiver device 120a or at the receiver devices 120 requesting/receiving the data. In different embodiments, any individual data items or any combination of the receiver data discussed above (e.g., recording timers, receiver configuration data, receiver home automation data, television content, etc.) may be identified in step 403 for transmission to one or more associated receivers 120. In some cases, different subsets of receiver data may be identified for transmitting to different associated receivers 120.

The determinations of the receiver data to be transmitted, as well as the receivers to which the data should be transmitted, may be performed automatically or manually in various embodiments. For example, the receiver 120a may be configured to generate and output a user interface via devices 150 and/160, to allow a user to select the specific types of receiver data (e.g., one or more specific recording timers, one or more specific configuration data items, one or more specific home automation configuration settings, one or more specific television programs, etc.). In some cases, such interfaces also may allow users to select the recipient receiver devices 120 for each identified set of receiver data. Thus, a user may interact with the interface to configure the receiver 120a to transmit certain recording timers to one associated receiver (e.g., 120b) and different recording timers to another associated receiver, certain receiver configuration settings to one associated receiver and different configuration settings to another associated receiver, certain programs to one associated receiver and different programs to another associated receiver, and so on.

In other embodiments, some of all of the determination of which receiver data should be transmitted and to which receivers, may be performed automatically based on configuration settings of the receiver 120a. For example, the receiver 120a may be configured (e.g., preconfigured by television provider 110 or configured by a user) to transmit specific types of receiver data to all associated receivers 120. In other examples, a receiver 120a may be configured transmit data only to certain associated receivers 120 and not to others. For example, the receivers 120 associated with a customer's account of the television provider 110 may be arranged using a master/slave model (or other hierarchical model) in which certain master (or higher ranked) receivers (e.g., 120a) are configured to transmit their configuration settings to slave (or lower ranked) receivers (e.g., 120b), but where the slave receivers do not transmit their configuration settings back to the master receivers. In other implementations, all associated receivers 120 may transmit any new updates to their receiver data (e.g., new recording timers, newly updated configuration settings, etc.) to all other associated receivers 120. In still other examples, only the new/updated receiver data that is associated with certain user accounts and/or viewer profiles may be identified for transmission in step 403. For example, new recording timers, receiver preferences and configuration settings, and/or home automation settings, etc., that are set/updated by certain users (e.g., authorized administrative users, parent accounts, etc.) may be transmitted to other associated receivers 120, whereas similar changes performed by other users (e.g., un-authorized users, guest users, child accounts, etc.) might not be transmitted to other associated receivers 120. It should be understood that any many different combinations of these communication models and techniques may be used to determine which receiver data should be propagated to which associated receivers 120 in step 403, and that the selection of which communication model, techniques, and criteria used for propagating receiver data between associated receivers 120 may be preconfigured by the television service provider and/or user-configured via any of the individual receiver devices 120.

Moreover, in some embodiments, the timing of the identification of receiver data in step 403, and the transmission of the receiver data in step 404, may be preconfigured and/or user-configurable using similar or identical techniques to those discussed above. For instance, the receiver 120a may be configured to identify and transmit receiver data to other associated receivers 120 in accordance with a predetermined transmission schedule. In other cases, the receiver 120a may be configured to identify and transmit receiver data to other associated receivers 120 based on the detection of a condition or trigger criteria, such as the creation of a new recording time, updating of receiver configuration settings or home automation settings, etc.

In step 404, the receiver data identified in step 403 may be transmitted via the IP network 115 from one receiver 120a to the one or more associated receivers 120. The process by which a recipient television receiver 120 may receive, analyze, and store and/or apply the receiver data is described below in reference to FIG. 5. As noted above, the transmission of the receiver data in step 404 may be performed over the IP network 115 between the separate physical locations and/or separate networks of the transmitting receiver device 120a and the recipient devices 120. Additionally, in some cases, the receiver data may include private, secure, and/or confidential data, such as receiver configuration settings, home automation settings, etc. Therefore, in some embodiments, the receiver 120a transmitting the data and the recipient receivers 120 may be respectively configured to encrypt/decrypt the receiver data, and/or to use various secure network communication techniques and protocols for transmitting the receiver data over the IP network 115. Such techniques may include, for example, security features and/or specialized hardware (e.g., hardware-accelerated SSL and HTTPS, WS-Security, firewalls, etc.), use of secure data transmission protocols and/or encryption, such as FTP, SFTP, and/or PGP encryption. SSL or TLS protocols, along with HTTP or HTTPS, also may be used to provide secure connections between separate television receivers 120 operating at separate locations, to provide authentication and confidentiality.

Figure 5:
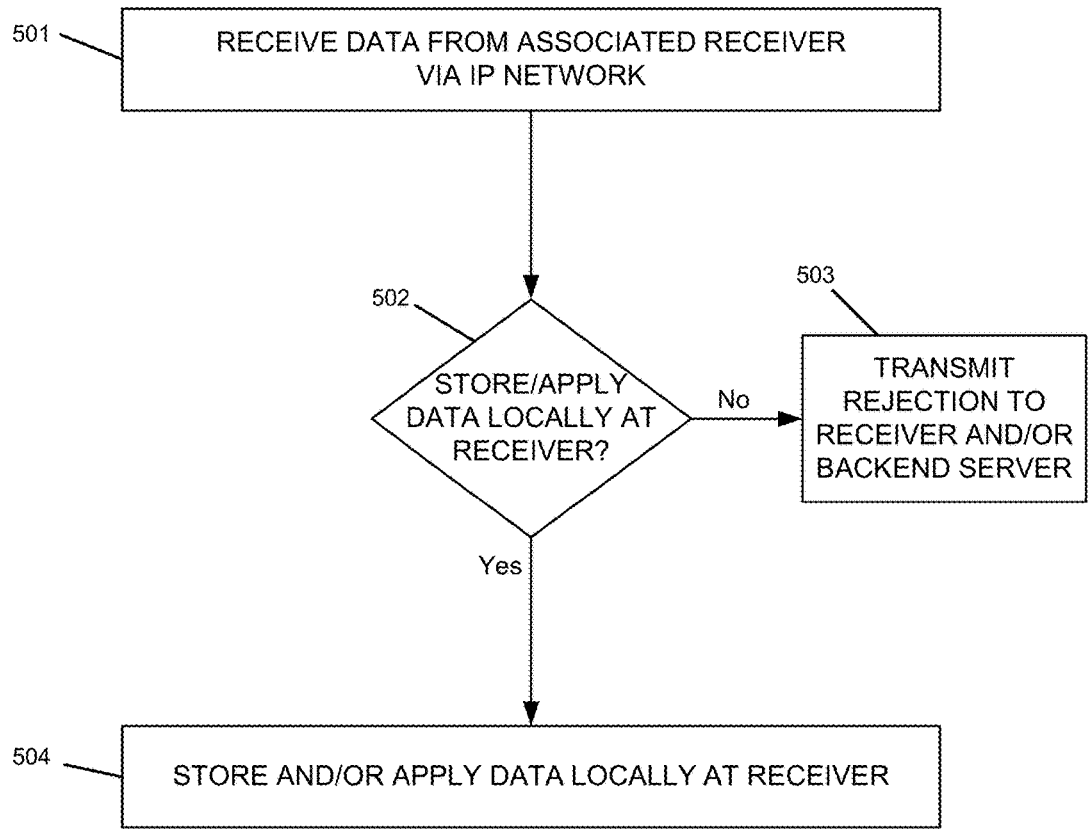
FIG. 5 is a flow diagram illustrating an example process in which a television receiver may store and/or apply data received from one or more associated receivers, according to one or more embodiments of the disclosure.

Referring now to FIG. 5, another flow diagram is shown illustrating a process of receiving various types of television receiver data at a receiver 120, from an associated receiver, and storing and/or applying the receiver data locally on the receiver 120. As discussed above with FIG. 4, the steps in this process also may be performed by one or more components in the receiver resource sharing system 100 and other related systems and components described above. For example, in some cases, steps 501-504 may correspond to the functionality performed by a satellite television receiver 120b (e.g., primary receiver 210), operating autonomously or in communication with user devices 160, backend servers 111, etc. In other cases, different combinations of devices may be used to perform the steps described below. Additionally, it should be understood that the techniques described herein for transmitting data between television receivers via IP networks need not be limited to the specific systems and hardware implementations described above in FIGS. 1-3, but may be performed within other computing environments comprising other combinations of hardware and software components.

In step 501, a television receiver 120 (e.g., a second satellite and/or cable television receiver 120b) may receive various receiver data from one or more associated television receivers 120. For example, step 501 may correspond to step 404, discussed above, in which a first television receiver 120a may transmit a set of receiver data to a second television receiver 120b over an IP network. As noted above, the receiver 120a transmitting the data and the receiver 120b receiving the data in step 501 may operate at separate locations, including separate physical locations and/or separate networks. Accordingly, these receivers 120 might be able to communicate over a local area network (LAN) or short-range wireless technologies, using local device identifiers, but instead may communicate over an IP network 115 using IP network addresses and/or other unique computer identifiers within a wide area networks (WAN) (e.g., the Internet). Additionally, the communication of receiver data in step 501 may traverse one or more LANs or WANs, subnetworks, routers, gateways, and firewalls and/or other network components between the receivers 120a and 120b. Further, as noted above, the receiver data received in step 501 may be encrypted and/or transmitted via various secure network communication techniques and protocols.

In step 502, the television receiver 120b may determine whether or not the receiver data will be stored and/or applied locally at the receiver device 120b. The determination in step 502 may be performed based on a number of factors, including the features and capabilities of the receiver 120b and other devices at the location of the receiver 120b, the availability of resources of the receiver 120b, and/or the permissions/authorization credentials associated with the received data. Several examples of possible determinations that may be performed in step 502 for receiver data received from an associated receiver 120 are described below, and it should be understood that these examples are illustrative only and non-limiting.

As an example, if the receiver data includes one or more recording timers, the receiver 120b may determine in step 502 whether the receiver 120b contains a sufficient number of tuners 304, disk space in DVR database 316, and/or other physical or software components for the recording timers to be set on the receiver 120b. Additionally, in some cases, the receiver 120b may be configured to determine whether or not the television programs corresponding to the timers can be recorded by the receiver 120b. For instance, based on the channel subscription package, time zone, geographic region, or other factors, the corresponding television programs might not be available for receiving and recording by the receiver 120b. In this example, if the corresponding television programs are not available (502: No), or if the receiver 120b lacks sufficient tuners, disk space, or other resources necessary to set the recording timers (502: No), then the receiver 120b may be configured to transmit a rejection (or error) message back to the transmitting television receiver 120a and/or to the backend server 111 of the television provider 110. However, if the receiver 120b determines that it is capable of setting the recording timers and receiving/recording the corresponding programming (502: Yes), then the recording timers may be set on the receiver 120b in step 503.

As an example, if the receiver data includes receiver configuration data, then the receiver 120b may determine in step 502 whether the receiver configuration data is compatible with and may be applied at the receiver 120b. For instance, certain receiver settings and/or configuration data (e.g., favorites lists, content restrictions, viewing preferences, parental controls, etc.) may be incompatible with hardware or software limitations of the receiver 120b, or may conflict with the administrative settings of the receiver 120b (502: No). In such cases, the receiver configuration data may be rejected by the receiver 120b in step 503.

Additionally, certain home automation configuration data received in step 501 may be incompatible with the home devices and appliances currently operating at the location of the receiver 120b. For instance, if the receiver data transmitted from a receiver 120a at a primary residence includes home automation configuration settings for a security camera, light controller, irrigation system, garage door, etc., but corresponding home devices are not installed at the secondary residence of the receiver 120b, then the receiver 120b may determine that home automation configuration data should be rejected in step 503.

As yet another example, if the receiver data includes actual television content (e.g., audio/video files corresponding to television programs, movies, sporting events, live broadcasts, etc.), or image data, music/audio content, etc., then the receiver 120b may determine in step 502 whether the receiver 120b contains a sufficient amount of disk space in a DVR database 316 (or other local storage) to store the television content. In some cases, the receiver 120b may determine whether the components needed to process and output the television content (e.g., demultiplexer 320, descrambling engine 324, audio/video decoder 326, etc.) are present at the receiver 120b and capable of processing and outputting the television content. Additionally, the receiver 120b may determine whether the television content format and characteristics (e.g., resolution, video format, three-dimensional content, etc.) are compatible with the presentation devices 150 and/or user devices 160 available at the receiver's 120b location to output the content. If the television content cannot be received and stored by the receiver 120b, or cannot by processed at output at the receiver's 120b location (502: No), then the receiver 120b may reject the television content data in step 503.

Additionally, as noted above, various communication models and/or authorization techniques may be used for propagating receiver data between a set of associated receivers 120. As discussed in step 403, these communication models and/or authorization techniques may be implemented by a transmitting device 120a while determine which receiver data should be transmitted to which associated receivers 120. However, in some cases, similar or identical communication models and/or authorization techniques may be implemented during the reception and/or analysis of receiver data by a receiving device 120b in steps 501-502. For example, the receiver 120b may be configured to receive and store/apply receiver data only from certain other associated receivers 120 (e.g., master receivers or higher-ranked receivers 120a), and not from other associated receivers 120. In other cases, the receiver 120b may be configured to compare timestamps associated with receiver data received in step 501 with the timestamps of corresponding receiver data stored locally, so that only the newest or most recently updated receiver data is stored and applied at the receiver 120*b*. Additionally or alternatively, the receiver data received in step 501 may include a user identifier or authorization credentials associated with a user that initiated the transmission of the receiver data, and the receiver 120*b* may determine whether to store and apply the receiver data based on the permissions associated with the user.

As noted in the above examples, if the receiver 120*b* determines that the various receiver data cannot or should not be stored and applied (502: No), then the receiver 120*b* may reject the data in step 503. In such cases, the receiver 120*b* may determine that the receiver data should not be stored locally by the receiver 120*b*. Additionally, the receiver 120*b* may (optionally) transmit an error message back to the receiver 120*a* that transmitted the data, or to a backend server 111, and/or may log the failure in a local system log and/or error logs. However, if the receiver 120*b* determines that the various receiver data may be stored and applied (502: Yes), then the storage and/or application of the receiver data is performed in step 504. The processes involved in storing and/or applying the receiver data in step 504 may depend on the type of the receiver data, as well as based on the components and features of the receiver 120*b* and/or the location associated with the receiver 120*b*. For example, internal processes may be invoked at the receiver 120*b* in step 504 to set/update the recording timers, change the receiver configuration settings, and/or store television content in a local data store (e.g., DVR database 316). Additionally, step 304 may involve the receiver 120*b* transmitting home automation configuration settings to various home devices and appliances installed at the location of the receiver 120*b*.

Figure 6:
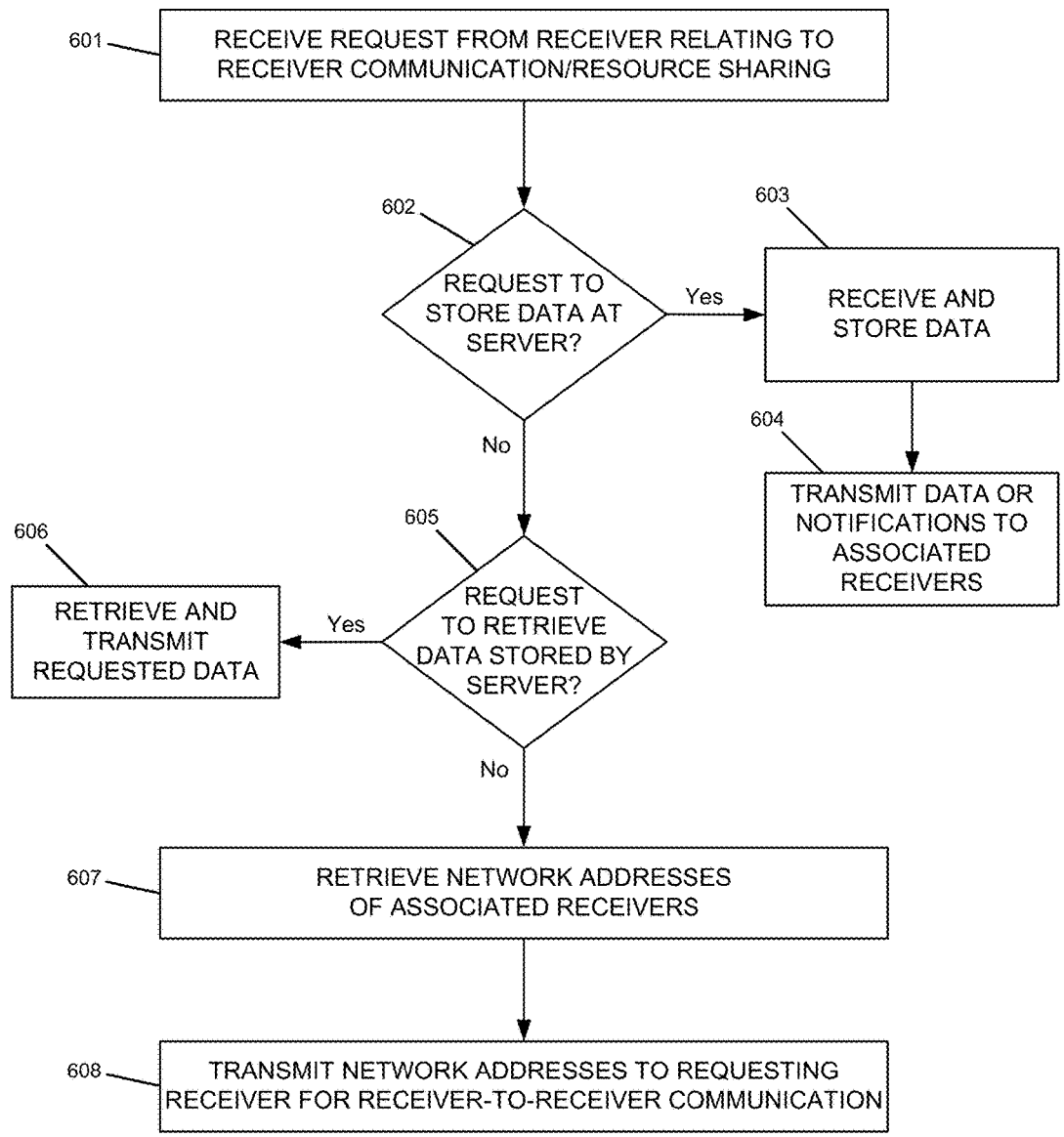
FIG. 6 is a flow diagram illustrating an example process in which a computer server of a television service provider transmits receiver data and/or receiver network address to a television receiver, according to one or more embodiments of the disclosure.

Referring now to FIG. 6, another flow diagram is shown illustrating a process by which a computer server of a television service provider may communicate with a number of associated television receivers 120. As discussed above in reference to FIGS. 4 and 5, in some embodiments, various types of receiver data (e.g., recording timers, receiver configuration data and settings, home automation data, actual television programs/content, etc.) may be transmitted between associated receivers 120 via an IP network 115. In the above examples, a backend server 111 of a television provider 110 may be used to store and provide network addresses of related television receivers 120, to enable direct receiver-to-receiver communication via the IP network 115. However, in other embodiments, the television provider 110 itself may serve as a receiver data repository, which receives and stores data from receivers 120, and then receives requests for and provides the data to other associated receivers 120. For example, a first receiver 120*a* may transmit any or all of the receiver data discussed above to the television provider 110, instead of or in addition to transmitting the receiver data to other receivers 120. In such cases, the receiver data may be transmitted over the IP network 115 to the backend server 111, using similar or identical techniques to those discussed above, and then stored in a receiver data store 112 at the television service provider 110. Subsequently, a second receiver 120*b* may contact the backend server 111 to request the receiver data of other associated receivers (e.g., receiver 120*a*). The backend server 111 may retrieve the requested data from data store 112, and then transmit the data to the second receiver 120*b* over the IP network 115.

Thus, in some embodiments, the direct receiver-to-receiver communication discussed above in FIGS. 4 and 5 may be replaced by various receiver-to-provider communications (and/or provider-to-receiver communications) in order to propagate receiver data among multiple associated receivers 120 operating at different locations. In such embodiments, the requests for and/or transmissions of receiver data may be performed with all of the same functional features and/or security, by implementing the same logic and including the same hardware and software features at the television provider, for example, by operating a receiver resource engine 130 and/or service 230 at the backend server 111. The replacement of direct receiver-to-receiver communication with receiver-to-provider communications may be complete in some embodiments, while only partial in other embodiments. For example, the backend server 111 and receiver data store 112 of a television provider 110 may be configured to store and provide access to certain types of receiver data (e.g., receiver configuration settings and preferences, home automation settings, etc.) for groups of associated receivers 120, but it may be inefficient or resource prohibitive to store other types of receiver data (e.g., individual recording timers, actual television content, etc.) at the television provider. Accordingly, the process illustrated in FIG. 6 corresponds to embodiments in which a television service provider 210 may store some, but not all, of the receiver data stored at the individual television receivers 120.

In step 601, a computer server of a television provider (e.g., backend server 111) may receive a request from a receiver 120*a* relating to communication, collaboration, and/or resource sharing with other associated receivers 120. For example, the request in step 601 may correspond to a request to obtain network addresses of associated receivers (e.g., for direct receiver-to-receiver communication), to upload various receiver data for access by other associated receivers 120, and/or to retrieve receiver data of other associated receivers 120. The request in step 601 may be received by the backend server 111 via IP network 115, and may use encryption and/or secure data transmission techniques and protocols, as discussed above.

In step 602, the backend server 111 may determine whether the request corresponds to a request from a first receiver 120*a* to store certain receiver data at the television provider 110, thereby making the data accessible to other associated receivers 120. If so (602: Yes), then in step 603 the backend server 111 may receive and store the receiver data in the receiver data store 112.

In step 604, after receiving and storing the data from receiver 120*a*, the backend server 111 may optionally transmit notifications (and/or the actual receiver data) to one or more receivers 120 associated with the receiver 120*a* that provided the data. As discussed above in step 402, the backend server 111 may retrieve the network addresses of any associated receivers 120 (e.g., receiver devices 120 at separate locations that are associated with the same customer and/or account of the television service provider 110). The backend server 111 may determine the associated receivers 120, for example, based on a receiver number, customer account, user identifier or other identification data received in the request from the receiver 120*a*. In some embodiments, the transmission in step 604 may correspond to a notification to one or more associated receivers 120 at different locations, indicating that certain receiver data has been updated at the provider 110. Such notifications, which may be sent via IP network 115, television broadcast, network 116, or other networks, may serve to inform the associated receivers 120 that their local receiver data (e.g., recording timers, receiver configuration data, receiver home automation data, television content, etc.) may be out of date, and may prompt these receivers 120 to request updated receiver data from the backend server. In others, the actual receiver data may be proactively transmitted to one or more associated receivers 120 in step 604.

In this example, if the request does not correspond to a request to upload and store receiver data at the television provider 110 (602: No), then the backend server 111 may determine that the request corresponds to a request from the receiver 120*a* to retrieve certain data from the backend server 111. For example, receiver devices 120 in some embodiments may be configured to request updated receiver data from the backend server 111. Such requests may be initiated by the receiver 120, for example, in response to a notification previously transmitted in step 604. As noted above, in various different embodiments, the backend server 111 and/or receiver data may store all, some, or none of the receiver data that resides on the separate receivers 120. Accordingly, in step 605, the backend server 111 may determine whether the requested receiver data is stored at the receiver data store(s) 112 of the television provider 110. If so (605: Yes), then in step 606 the backend server 111 may retrieve the requested receiver data from the receiver data store 112, and transmit the data back to the requesting receiver 120*a*. Using similar techniques to those discussed above in step 404, the receiver data may be transmitted in step 606 over the IP network 115, using various encryption and/or secure data transmission techniques and protocols.

If, in step 605, the backend server 111 determines that the requested receiver data is not stored by the television provider 110 (605: No), then in step 607 the backend server 111 may retrieve the network addresses (e.g., IP addresses) of one or associated receivers 120 from the receiver data store 112. In step 608, the backend server 111 may transmit the network addresses of the associated receivers 120, via the IP network 115, to the requesting receiver 120*a*, to enable direct receiver-to-receiver communication as discussed above in reference to FIGS. 4 and 5.

The sections above describe various embodiments relating to the communication of receiver data between different receivers 120 operating at different locations, using direct receiver-to-receiver communication and/or using an intermediary server 111 of a television provider 110. As discussed in these sections, the data transmitted between associated receiver devices 120 may include, for example, recording timers, receiver configuration settings and preferences, home automation device settings, television content, etc. However, FIGS. 7 and 8, discussed below, describe additional embodiments and examples in which the data communicated between associated receivers 120 may include requests and responses to determine the availability of certain receiver hardware and software resources, and to assign the resources of one receiver to perform a task on behalf of another receiver. For example, if a first receiver 120*a* determines that it does not have sufficient resources (e.g., tuners, storage space, etc.) to receive and output/record a particular television program, the first receiver may transmit a request for the necessary resources to a number of associated receivers 120 operating at separate locations. One or more of the associated receivers 120 may respond to the resource request, and the appropriate hardware or software resources of the associated receivers 120 may be assigned to perform the task for the first receiver 120*a*. Thus, while FIGS. 7 and 8 may use similar or identical processes and techniques for communicating data between associated receivers 120, the embodiments described below provide additional opportunities and advantages for collaboration and resource sharing between receivers.

Figure 7:
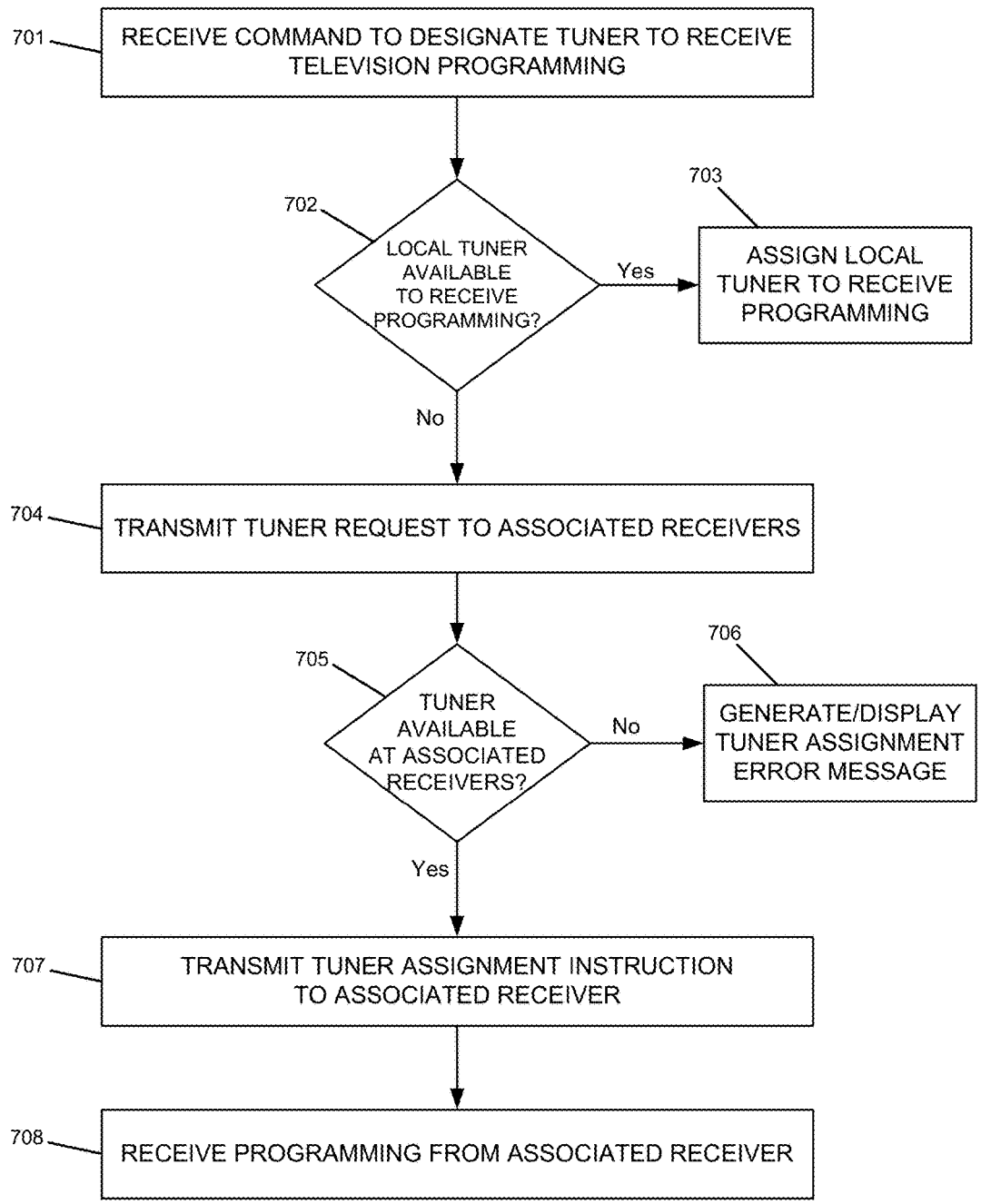
FIG. 7 is a flow diagram illustrating an example process in which a television receiver identifies and assigns a tuner and receives programming from a separate television receiver, according to one or more embodiments of the disclosure.

Referring now to FIG. 7, a flow diagram is shown illustrating a process of sharing resources between associated television receivers 120 operating at separate locations. Specifically, this process illustrates an example in which a receiver 120*a* determines that it does not have an available tuner to receive a television program requested by a user for viewing and/or recording. In response, the receiver 120*a* requests, identifies, and assigns an available tuner from an associated receiver 120 at a separate location. As discussed above with FIGS. 4 and 5, the steps in this process may be performed by one or more components in a receiver resource sharing system 100 and other related systems and components described above. For example, steps 701-708 may correspond to the functionality performed by television receivers 120*a* and/or 120*b* operating autonomously or in communication with user devices 160, backend servers 111, etc. In other cases, different combinations of devices may be used to perform the steps described below. Additionally, it should be understood that the techniques described herein for transmitting data between television receivers via IP networks need not be limited to the specific systems and hardware implementations described above in FIGS. 1-3, but may be performed within other computing environments comprising other combinations of hardware and software components.

In step 701, a user command is received at a television receiver 120*a*, for example, via a remote control 170 or user device 160, to receive one or more particular television programs. For example, a user may request that a certain television program or a series of programs be recorded and stored in the DVR database 316. Additionally or alternatively, a user may select a television program currently being broadcast for immediate live viewing.

In step 702, the television receiver 120*a* determines whether it has sufficient resources (e.g., tuners) to receive the requested programming. As discussed above, many television receivers 120 may have multiple different tuners, such as the six tuners 304*a*-*f* of receiver 210 shown in FIG. 3, and different types of receivers 120 may have more or less tuners in other examples. However, during the operation of the receiver 120*a*, its different tuners 304 may be assigned to tune to and receive different programs, for example, based on multiple overlapping DVR recording timers, requests for live or delayed television viewing at one or more presentation devices 150, activation of picture-in-picture functionality that requires one or more additional tuners 304, and various additional receiving/recording features such as a PTAT (Primetime Anytime) implementation, etc. Thus, in different cases, the receiver 120*a* may or may not have a tuner available to be assigned to receive the requested programming.

Additionally, the determination in step 702 may occur immediately in response to the user's request, or at a later time. For example, series recordings that have been previously set on the receiver 120*a* and/or television programs whose broadcast times may have been changed or extended may have the potential to cause a tuner conflict. As such, the determination in step 702 also may be performed in response to receiving upcoming programming schedule data (e.g., EPG data) and/or updates to broadcast schedules, during which the receiver 120*a* may determine whether the new/updated programming schedule data causes a conflict that may result in an unavailable tuner.

After analyzing its current and future schedule tuner usage, if the receiver 120*a* determines that it has a sufficient number of tuners to accommodate the request (702: Yes), it may proceed to step 703 to assign a local tuner 304 to receive the television programming in accordance with the user's request. However, if the receiver 120*a* determines that it does not have a sufficient number of tuners to accommodate the user's request (702: No), it may proceed to step 704 to request assignment of an available tuner from one or more associated receivers 120 operating at separate locations. The request in step 704 may be performed using similar or identical techniques to those discussed above in steps 401-404. For example, the receiver 120a in step 704 may initially contact one or more backend server 111 to retrieve network addresses of associated receivers 120, and then may transmit the request to the associated receivers 120, over IP network 115. In other examples, as discussed above in reference to FIG. 6, the backend server 111 may store certain (or all) receiver data itself, including the availability schedules of tuners 304, storage space, and/or other resources at each separate receiver device in a group of associated receivers 120. Thus, in various different embodiments, the request in step 704 may be sent from a first receiver 120a directly to a number of associated receivers 120, or directly to the backend server 111, or indirectly to the associated receivers 120 through an intermediary backend server 111.

In step 705, one or more of the associated receivers 120 that received the request in step 704 may respond to receiver 120a indicating whether or not it has an available tuner 304 to accommodate the user's request. In some embodiments, availability of a tuner 304 at an associated receiver 120 may depend not only on the time and duration of the programming indicated in the request, but also on additional factors such as the channel subscription package, time zone, geographic region, which may be different from those at the receiver 120a that sent the request. The responses received from the various associated receivers 120 may be sent using similar or identical techniques to those used to send the request in step 704. For instance, the responses associated receivers 120 also may be transmitted over the IP network 115, and also may potentially use encryption and/or secure data transmission techniques and protocols. In some cases, the responses from associated receivers 120 in step 705 might not require any interaction with the backend server 111, since the responding receivers 120 may already have the network address of the requesting receiver 120a from the request.

If the receiver 120a does not receive any affirmative responses from any associated receivers 120 (705: No), then the receiver 120 may generate and output an interface (e.g., to presentation device 150 and/or user device 160) in step 706, indicating that the television program requested in step 701 cannot be received for recording or live viewing. However, if one or more of the associated receivers 120 (e.g., 120b) indicates that it has an available tuner for receiving the program requested in step 701 (705: Yes), the in step 707 the receiver 120a may transmit a confirmation and/or instruction to the associated receiver 120b, asking/instructing the receiver 120b to assign its available tuner to receive the requested program. In some embodiments, the communications in steps 704 and 707 need not separate communications. For example, a single request communicated from a requesting receiver 120a to a particular associated receiver 120b may serve the functions of determining resource availability and instructing the particular associated receiver 120b to automatically assign any available resources in response to the request, and a single response from the associated receiver 120b back to the requesting receiver 120a serves either to confirm resource availability and assignment, or to indicate that that the requested resources are not available at the associated receiver 120b.

In some cases, a receiver 120a may receive affirmative responses from more than one associated receiver 120 in step 705. In such cases, the receiver 120a may determine in step 706 which of the associated receivers 120 should be tasked with receiving and transmitting back the requested television programming. When multiple receivers 120 are available to service the request (e.g., multiple receivers 120 determine and indicating that they have the available tuners, storage space, network transmission capabilities, etc.), then the receiver 120a may determine a particular receiver 120b to handle the request based one or more factors, for example, the order that the receiver 120a received the responses in step 705, the number of available tuners 304 at each of the responding receivers 120, the geographic locations of the responding receivers with respect to the requesting receiver 120a, the network availability, bandwidth, and/or usage costs of transmitting data between each of the responding receivers and the requesting receiver 120a, etc.

After receiving responses from associated receivers 120 in step 705, and then assigning/instructing a particular receiver 120b to receive and transmit back the television programming in the step 707, the receiver 120a may receive the programming from the assigned receiver 120b in step 708. In some embodiments, the receiving and storing of the programming in step 708 may be performed using similar or identical techniques to those discussed above in steps 501 and 504. For example, because receivers 120a and 120b may operate at separate locations (e.g., including separate physical locations and/or separate communication networks), they may communicate over an IP network 115 using IP network addresses and/or other unique computer identifiers within a wide area networks (WAN) (e.g., the Internet). Additionally, transmission of the programming in step 708 may traverse one or more LANs or WANs, subnetworks, routers, gateways, and firewalls and/or other network components between receivers 120a and 120b. Further, as noted above, the television programming received in step 708 may be encrypted and/or transmitted via various secure network communication techniques and protocols in some cases.

Figure 8:
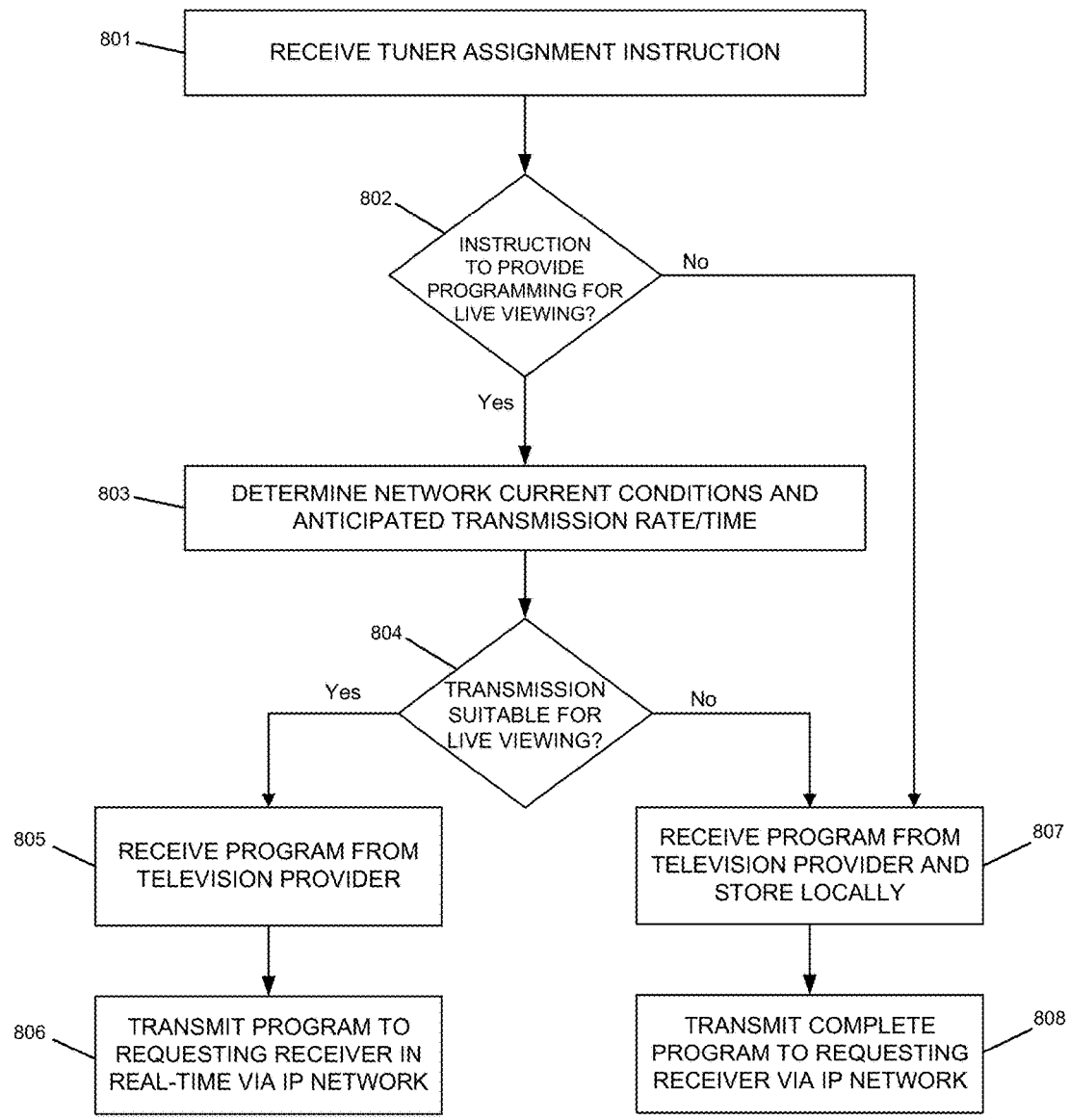
FIG. 8 is a flow diagram illustrating an example process in which a television receiver receives a tuner assignment instruction, and then receives and transmits television programming to an associated receiver, according to one or more embodiments of the disclosure.

Referring now to FIG. 8, another flow diagram is shown illustrating a process of receiving a tuner assignment instruction from an associated receiver device 120 operating at a separate location, receiving television programming based on the instruction, and then transmitting programming back to the associated receiver 120. In some embodiments, the process shown in FIG. 8 may be performed in conjunction with the tuner sharing process discussed above in FIG. 7. For example, the steps in this process may be performed by a television receiver 120b that receives and responds to a resource sharing request (e.g., a tuner sharing request) from an associated receiver 120a operating at a separate location. As described below, the receiver 120b in this example may use one of its available tuners 304 to receive the requested programming from a satellite, cable, other television transmission network (e.g., satellite network 116). The receiver 120b then may store and transmit the requested programming back to the receiver 120a that initiated the tuner sharing request. The examples discussed below in FIG. 8 relate to the techniques that the receiver 120b may use to transmit the programming back to the receiver 120a, including real-time transmission for live viewing, or later transmission for delayed viewing.

In step 801, the receiver 120b may receive a tuner assignment instruction from an associated receiver 120a. The tuner assignment instruction received in step 801 may correspond to the assignment instruction transmitted in step 407 (and/or the initial request in step 404). The tuner assignment instruction from the receiver 120a may include data identifying the television program(s) to be recorded, such as the television provider, channel, and time at which the programs are scheduled to be broadcasted.

In some embodiments, the receiver 120*a* that is requesting a tuner 304 may indicate to the receiver 120*b* providing the tuner 304, whether the programming is being requested for live viewing or to be recorded for later viewing. For example, if the user at receiver 120*a* selected a television program (or series of programs) to be recorded and stored in the DVR database 316 of the receiver 120*a*, then the tuner sharing request/assignment received by receiver 120*b* in step 801 may indicate that the requested programming need not be transmitted back for real-time viewing. In contrast, if the user at receiver 120*a* selected a television program for immediate live viewing (e.g., by turning on the receiver, changing the channel, etc.), then the subsequent tuner assignment instruction received in step 801 may indicate that the requested programming should, if possible, be transmitted back for real-time viewing. Accordingly, in step 802, the receiver 120*b* may determine whether the instruction in step 801 includes such an indication and/or if a request has been received to provide programming for live viewing at the requesting receiver 120*a*. If not (802: No), then receiver 120*b* may proceed to step 807 to receive, store, and transmit back to the requested program on a delayed basis.

On the other hand, if the receiver 120*b* has received an indication that the programming is being requested for live viewing at the receiver 120*a* (802: Yes), then in step 803, one or both of the receivers 120*a* and 120*b* may determine and analyze the network conditions associated with transmitting the requested program(s) from receiver 120*b* back to receiver 120*a*. For example, receivers 120*a* and/or 120*b* may determine, individually or collaboratively, an anticipated transmission time or transmission rate for the sending the requested program(s) over the IP network 115. The determination in step 803 may depend on the size of the program(s) to be transmitted, the current conditions network of the IP network 115 connecting the receiver 120*a* and 120*b*, as well as the current conditions of any local networks at the location of the receiver 120*a* and/or 120*b* and other local factors. In some cases, receivers 120*a* and 120*b* may store and analyze data from previous network transmissions over the IP network 115, such as transmission times, rates, bandwidth measurements, collision or congestion detections, etc. Additionally or alternatively, receivers 120*a* and/or 120*b* may send test transmissions over the IP network 115 to the other receiver (and/or other devices on the same network) to determine current network conditions and anticipated transmission times for the requested programming.

In step 804, the analyses of the network conditions in step 803 may be used to determine whether the program(s) can be transmitted from receiver 120*b* back to receiver 120*a* in suitable fashion for live viewing. For example, if the requested programs cannot be transmitted back to receiver 120*a* in real-time, at least at the same rate the programs will be output to a presentation device 150, then the receiver 120*b* may determine that the programs cannot be transmitted back to the receiver 120*a* at a sufficient rate for live viewing (804: No). In some cases, even a greater transmission rate (i.e., a shorter anticipated transmission time) may be required, based on a predetermine transmission rate multiplier used to allow buffering and the prevention of interruptions in the viewing experience in the event of a brief network interruption or slowdown.

In some embodiments, the receiver 120*b* may determine in step 804 that the programs may be compressed and/or downconverted (e.g., converted to lower resolution video data) before transmission, reducing the size of the programs enough so that they may be transmitted at a suitable rate for live viewing at the receiver 120*a*. In such cases, the receiver 120*b* may further base the determination in step 804 on the additional time required to compress, uncompress, and/or downconvert the programs. Additionally, in some embodiments, the receiver 120*a* may indicate certain video resolution and/or audio quality preferences or requirements for the transmission of the programs from receiver 120*b*, and/or certain types of video compression techniques that should or should not be used for the transmission. In some cases, the determination in step 804 also may depend on network costs associated with the transmission over the IP network 115, for example, network usage costs that fluctuate by time-of-day, bandwidth quotas and overage charges, etc. In such cases, the receiver 120*b* may be configured to compare an anticipated network usage cost with a maximum cost threshold, to determine whether the programs should be transmitted in over the network 115 in real-time.

In step 804, if the receiver 120*b* determines that the programs may be transmitted back to receiver 120*a* at a suitable rate/speed for live viewing (804: Yes), then the receiver 120*b* may proceed to steps 805-806 to receive, store, and retransmit the programs to receiver 120*a* for live viewing. For example, in step 805, the receiver 120*b* may configure a shared tuner 304 to receive the requested programming over the satellite network 116 (and/or other television broadcast networks). In step 806, the receiver 120*b* may packetize and encode the received program(s) for IP transmission, and then transmit the television program packets over the IP network 115 to receiver 120*a*. When receiving and re-transmitting programs for live viewing at the receiver 120*a*, receiver 120*b* may perform steps 805-806 in a continuous loop so that content is continuously transmitted to the receiver 120*a* at a rate suitable for live viewing.

To the contrary, if the receiver 120*b* determines that the programs cannot be transmitted back to receiver 120*a* at a suitable rate/speed for live viewing (804: No), then the receiver 120*b* may proceed to steps 807-808 to receive, store, and retransmit the programs to receiver 120*a* on a delayed basis. For example, in step 807, the receiver 120*b* may configure a shared tuner 304 to receive the requested programming over the satellite network 116 (and/or other television broadcast networks), and then store the complete program (or programs) locally at the receiver 120*b* (e.g., in DVR database 316). In step 808, the receiver 120*b* may retrieve, packetize, and encode the complete program (or programs), and then transmit the program(s) over the IP network 115 to the receiver 120*a*. When transmitting the program(s) at a delayed time in step 808, the receiver 120*b* may commence the transmission immediately after the complete programs have been received and stored, or may select a later transmission time based on various network factors. For example, the receiver 120*b* may select a transmission time and/or rate based on the current conditions of the IP network 115, network usage patterns at different times, associated network costs, etc. Additionally, as discussed above, the transmission of television programming content over the IP network 115 in steps 806 and/or 808 may use any of the secure data transmission protocols and/or encryption techniques discussed herein.

Figure 9:
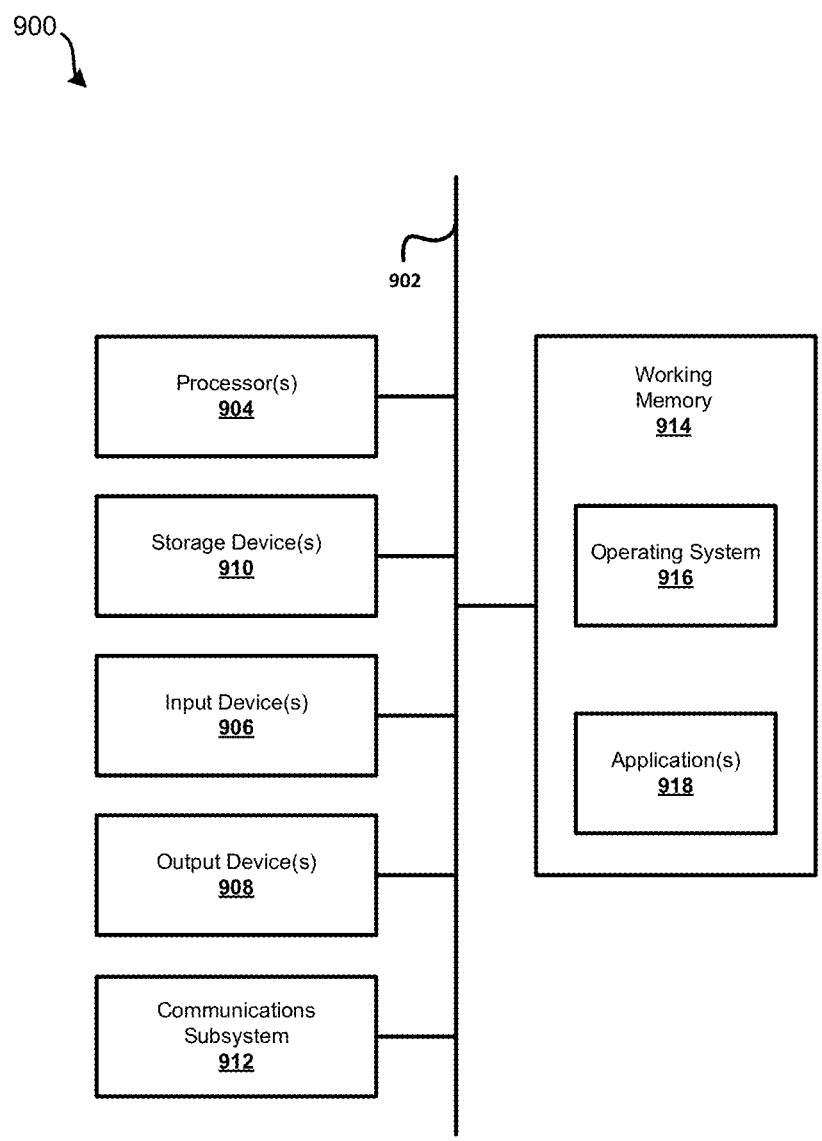
FIG. 9 is a block diagram illustrating an example computing system upon which various features of the present disclosure may be implemented.

Referring now to FIG. 9, an example is shown of a computer system or device 900 in accordance with the disclosure. Examples of computer systems or devices 900 may include systems, controllers, monitors, or the like, an enterprise server, blade server, desktop computer, laptop computer, tablet computer, personal data assistant, smartphone, gaming console, set-top box, television receiver, and/or any other type of machine configured for performing calculations. Any particular one of the previously-described computing devices may be wholly or at least partially configured to exhibit features similar to the computer system 900, such as television receivers 120, television provider servers and systems 110, and/or any of the respective elements or components of at least FIGS. 1-3. In this manner, any of one or more of the respective elements of those figures may be configured and/or arranged, wholly or at least partially, for implementing the various receiver communication, collaboration, and resource sharing functionality discussed above. Still further, any of one or more of the respective elements of at least FIGS. 1-3 may be configured and/or arranged to include computer-readable instructions that, when executed, instantiate and implement various functionality described herein (e.g., one or more receiver resource sharing engines 130 and/or services 230).

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the disclosure. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904. It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A television receiver system, comprising:
a first television receiver device, comprising:
one or more tuners that receive television programming broadcast by a television service provider;
one or more processors; and
memory communicatively coupled with and readable by the one or more processors and having stored therein processor-readable instructions which, when executed by the one or more processors, cause the first television receiver device to:
execute a receiver resource sharing engine that allows resource sharing between the first television receiver device and a second television receiver device located in different residences;
establish a connection to the Internet;
transmit a request to a server system operated by the television service provider that requests resource sharing, wherein the request to the server system comprises customer account data identifying a customer account wherein the resource sharing increases recording and storage capabilities available to the first television receiver device by assigning tasks that cannot be performed by the first television receiver device to the second television receiver device;
in response to the request transmitted to the server system, receive a network address of the second television receiver device linked with the first television receiver device, wherein the server system operated by the television service provider accesses a receiver data store to identify the second television receiver device as linked with the customer account;
identify data within the first television receiver device to transmit to the second television receiver device at the network address via the Internet, wherein the data is indicative of a record timer;
transmit the identified data from the first television receiver device to the second television receiver device via the Internet using the network address; and the second television receiver device, comprising:

one or more tuners that receive television programming broadcast by the television service provider;
one or more processors; and
memory communicatively coupled with and readable by the one or more processors and having stored therein processor-readable instructions which, when executed by the one or more processors, cause the second television receiver device to:
receive the identified data from the first television receiver device;
determine that sufficient resources are available at the second television receiver device to record a television program on a television channel based on the record timer, wherein the sufficient resources comprise: an available tuner, available storage space, and a subscription package that includes the television channel; and
in response to determining that sufficient resources are available, record the television program based on the record timer indicated by the data.

2. The television receiver system of claim 1, wherein the identified data is transmitted to the second television receiver device over a wide area network (WAN) using a secure transmission protocol.

3. The television receiver system of claim 1, wherein transmitting the identified data to the second television receiver device comprises:
   determining at least one of a data transmission speed or an anticipated data transmission time duration, associated with the transmission of the identified data to the second television receiver device;
   determining a start time for transmitting the identified data to the second television receiver device, based on the at least one of the data transmission speed or anticipated data transmission time duration; and
   transmitting the identified data to the second television receiver device, at the determined start time.

* * * * *